(12) United States Patent
Ruiz

(10) Patent No.: US 12,722,074 B1
(45) Date of Patent: Sep. 1, 2026

(54) DICE FOR A GAME AND METHOD OF PLAYING A GAME WITH DICE

(71) Applicant: Peter R. Ruiz, Chicago, IL (US)

(72) Inventor: Peter R. Ruiz, Chicago, IL (US)

( * ) Notice: Subject to any disclaimer, the term of this patent is extended or adjusted under 35 U.S.C. 154(b) by 0 days.

(21) Appl. No.: 19/235,952

(22) Filed: Jun. 12, 2025

(51) Int. Cl.
*A63F 9/04* (2006.01)
*A63F 13/80* (2014.01)

(52) U.S. Cl.
CPC ............ *A63F 9/0413* (2013.01); *A63F 13/80* (2014.09); *A63F 2009/0488* (2013.01)

(58) Field of Classification Search
CPC ............................... A63F 9/0413; A63F 13/80
See application file for complete search history.

(56) References Cited

U.S. PATENT DOCUMENTS 4,900,031 A * 2/1990 Wohl .................. A63F 3/00006 273/272
5,639,094 A * 6/1997 Manchester .......... A63F 9/0413 273/432

* cited by examiner

*Primary Examiner* — Thomas H Henry
(74) *Attorney, Agent, or Firm* — Greer, Burns & Crain Ltd.

(57) ABSTRACT

A game played with dice. The dice includes a first set having letters and may include a second set. The dice are rolled twice to create a list of two-letter pairs. Players record famous people having initials that correspond to the two letters of each pair. The entries of the players are compared, and points are awarded. A wild may be used which allows one of the letters of a pair to be selected or to be unassigned.

10 Claims, 2 Drawing Sheets

DICE FOR A GAME AND METHOD OF PLAYING A GAME WITH DICE

FIELD OF THE INVENTION

The present invention relates to a game, and more specifically a game played with dice and to the dice for playing such a game.

BACKGROUND OF THE INVENTION

People have long enjoyed playing games. Beyond the enjoyment brought by playing games, studies have shown that playing games can provide a way to stimulate brain activity and develop or maintain, for example, memory, logic, and reasoning. In addition to brain activity, board played with other people promote social interaction. Accordingly, there is an ongoing need for providing games for people to play.

SUMMARY OF THE INVENTION

A new game has been invented which uses sets of dice to create lists containing pairs of letters and requires players to recall names of famous people with initials that match the pairs of letters on the list. This game provides opportunities to promote memory recall, increase social interaction, utilize fine motor skills, and utilize or improve other mental and physical traits.

Accordingly, in an aspect of the present invention, the present invention may be generally characterized as providing a game having a first plurality of dice, each die from the first plurality of dice comprising six sides, and each side comprising a letter selected from a group consisting of: A, B, C, D, E, F, G, H, I, J, K, L, M, N, O, P, R, S, T, V, W, and wild.

The first plurality of dice may have between two to sixteen dice. For example, in some embodiments, the first plurality of dice includes twelve dice.

In the first plurality of dice, only a single side may have a wild.

The game may further include a second plurality of dice with each die from the second plurality of dice comprising six sides, and each side comprising a letter selected from a group consisting of: Q, U, X, Y, Z, and wild. In the second plurality of dice, only a single side may have a wild. The second plurality of dice may include between two to six dice. The second plurality of dice may have three dice. The dice of the first plurality of dice may be visually distinguishable from the dice of the second plurality of dice.

It is contemplated that any of the dice are virtual dice.

In another aspect, the present invention may be characterized, broadly, as providing a method of playing a game by two or more players by: a) rolling, in a first roll, a first plurality of dice, each die from the first plurality of dice comprising six sides, and each side comprising a letter selected from a group consisting of: A, B, C, D, E, F, G, H, I, J, K, L, M, N, O, P, R, S, T, V, W, and wild; b) determining and announcing an order of the letters shown on the first roll; c) re-rolling, in a second roll, the first plurality of dice; d) determining and announcing an order of the letters shown on the second roll so as to create a list of pairs of letters, each pair of letter including one letter from each side from the first roll and one letter from each side from the second roll, wherein no sides are reused from either roll; e) for each player, creating an entry by assigning a famous person to each pair of letters form the list of pairs of letters such that a first letter in a first name of the famous person corresponds to the first letter in a respective pair of letters and a first letter in a last name of the famous person corresponds to the second letter in the respective pair of letters; f) comparing the entries of each player and awarding points for each pair of letters and assigning a score based on the comparison; and, g) determining a winner based on the points awarded.

The method may further include, before step g), repeating steps a) to f) a number of times corresponding to a number of players.

It is contemplated that step a) may further include rolling, in the first roll, a second plurality of dice, each die from the second plurality of dice comprising six sides, and each side comprising a letter selected from a group consisting of: Q, U, X, Y, Z, and wild. Additionally, step c) may further include re-rolling, in the second roll, the second plurality of dice.

For the method, it is also contemplated that the dice are virtual dice.

Further, in still another aspect the present invention may be characterized as providing a non-transitory computer readable medium comprising instructions that when executed by a processor cause the processor to perform one or more steps of any of the methods described herein.

These and other aspects and embodiments of the present invention will be appreciated by those of ordinary skill in the art based upon the following description of the drawings and detailed description of the preferred embodiments.

BRIEF DESCRIPTION OF THE DRAWINGS

The attached drawings will make it possible to understand how the invention can be produced and practiced, in which.

DETAILED DESCRIPTION OF THE PREFERRED EMBODIMENTS

As mentioned above, a new game has been invented which uses sets of dice to have players recall famous names. Moreover, in addition to playing a game in real life, the present invention also contemplates that the game is played virtually.

Accordingly, with reference to the attached drawings, one or more embodiments of the present invention will now be described with the understanding that the described embodiments are merely preferred and are not intended to be limiting.

Figure 1:
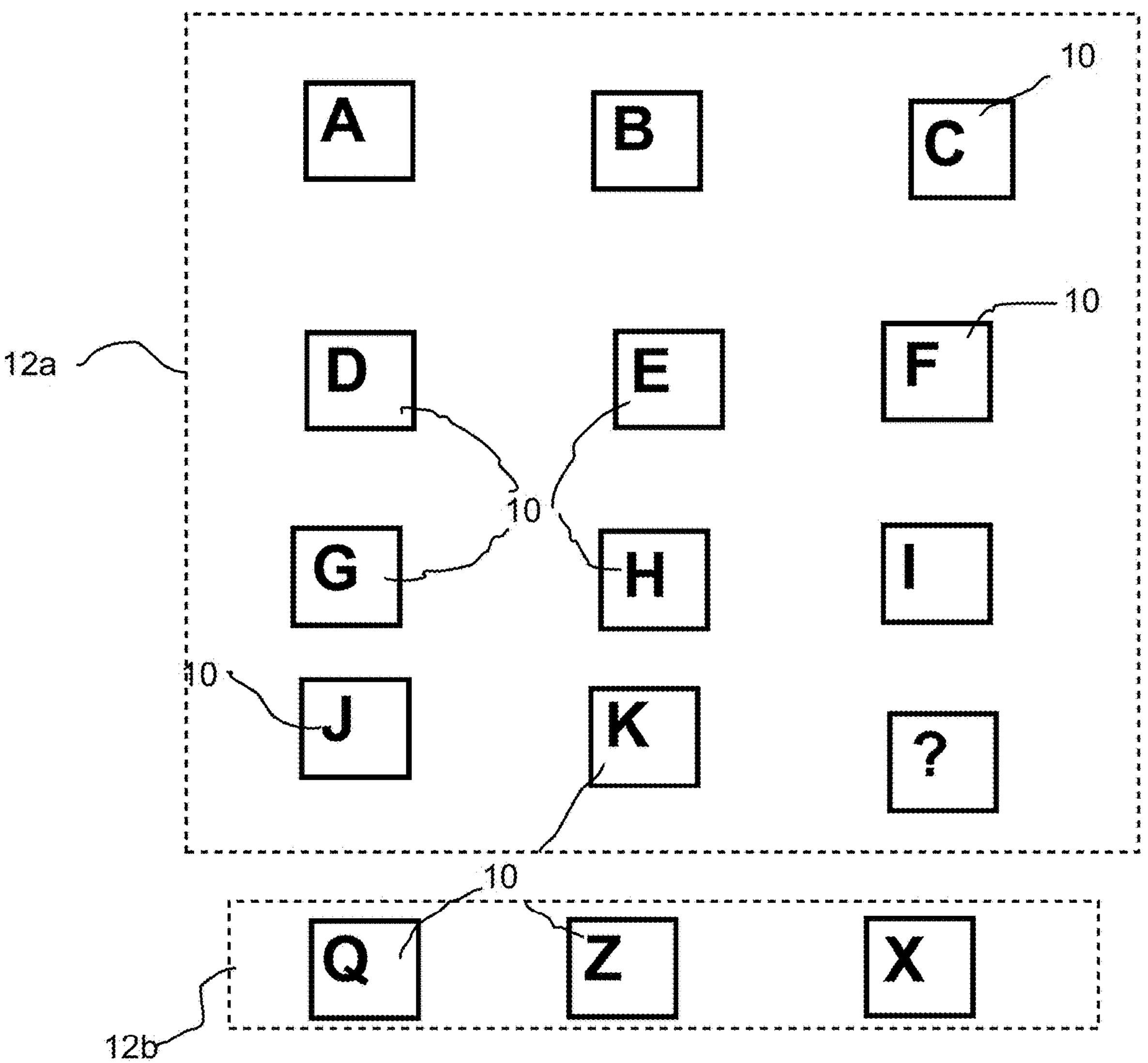
FIG. 1 is a top view of dice used to play the game according to one or more embodiments described herein.

With reference to FIG. 1, the game is played with dice 10. Specifically, depending on the embodiment of the game, the dice 10 includes a first plurality 12*a* of dice 10 and, may also include a second plurality 12*b* of dice 10.

Figure 2:
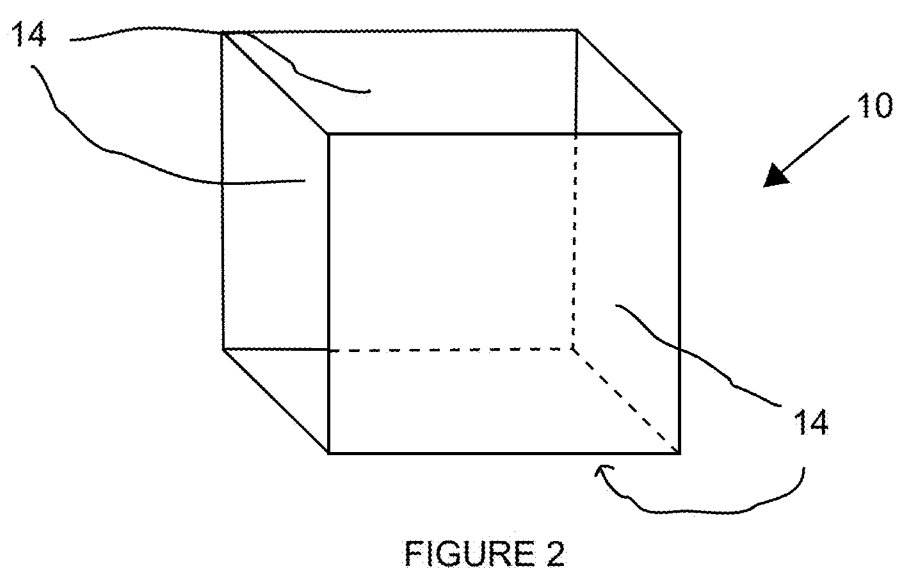
FIG. 2 is a front and side view of an exemplary die used to play the game according to one or more embodiments described herein; and, FIG. 3 is a flaw chart of an exemplary embodiment of the game according to the present disclosure.
Figure 3:
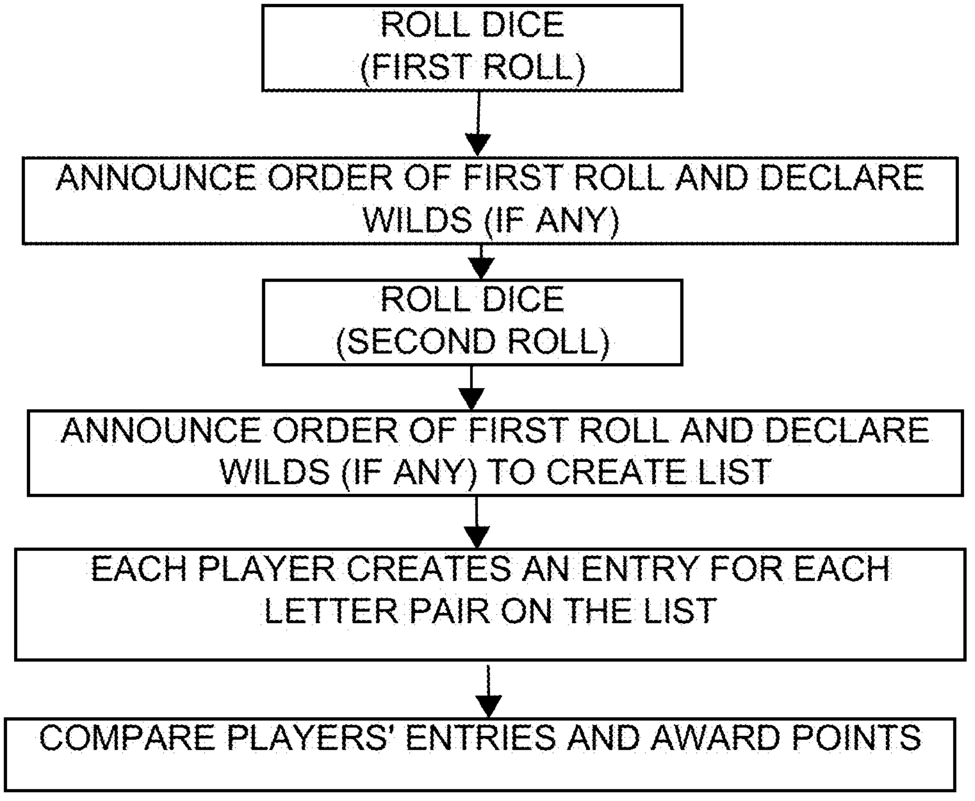

As shown in FIG. 2, each die 10 from the first plurality 12*a* of dice 10 has six sides 14 and each side 14 of each die 10 in the first plurality 12*a* displays a letter selected from a group consisting of: A, B, C, D, E, F, G, H, I, J, K, L, M, N, O, P, R, S, T, V, W, and wild. The "wild" may be represented by a symbol such as a questions mark ("?") or an asterisk sign ("*"). In the first plurality 12*a* of dice 10, it is preferred that only a single side 14 has the wild.

The number of dice 10 in the first plurality 12*a* may be from two to sixteen, for example, twelve dice 10. The following description will continue with an embodiment in which the first plurality 12*a* includes twelve dice 10. This is merely preferred.

The dice 10 in the second plurality 12*b* includes dice 10 with six sides 14, as shown in FIG. 2, and each side 14 of each dice 10 in the second plurality 12*b* contains a letter selected from a group consisting of: Q, U, X, Y, Z, and wild. Again, the "wild" may be represented by a symbol—which may be the same or different from the symbol in the dice 10 of the first plurality 12*a*.

The number of dice 10 in the second plurality 12*b* may be from two to six, for example, three. The following description will continue with an embodiment in which the second plurality 12*b* includes three dice 10. This is merely preferred.

The dice 10 of the first plurality 12*a* are preferably visually distinguishable from the dice 10 of the second plurality 12*b*. For example, a color of the letters may be different, or the color of the material of the dice 10 may be different, or a font of the letters may be different.

With these dice 10, the present game in many various embodiments may be played in real life. However, as mentioned above, the present invention may be virtually played and, thus the dice 10 may include a virtual die that comprises computer programming (i.e., a LIST) which includes as variables the relevant letters discussed above for the real dice 10.

In general, the objective of the game, real or virtual, is to recall as famous people based on lists of initials created from rolling the dice 10. The famous people may be alive, dead, real, or fictional and may be celebrities, actors, characters, musicians, athletes, politicians, internet stars, historical figures, to name a few. Points are allotted based on comparing a list made by each player with the other players' lists. The player with the highest point total after a specified number of rounds is declared the winner.

The game begins with a first player rolling the first plurality 12*a* of dice 10 in a first roll. Once the dice 10 are rolled, the first player arranges the dice 10 in an order and announces the order so that the other players (and the first player) may write the order down. For example, the first player could arrange the letters in a row or column and read the letters along the row or column.

After the first roll, the dice 10 of the first plurality 12*a* are re-rolled in a second roll. Once again, after the dice 10 are re-rolled, the first player again arranges the dice 10 in an order and announces the order so that the other players (and the first player) may write the order down to create a list of pairs of letters.

Each pair of letters includes one letter from the first roll and one letter from the second roll. Additionally, no side from a roll is reused. In other words, while a single roll may include two of the same letters, the same letter is not re-used from a single die 10. For example, if the first roll includes two different dice 10 showing the letter "S", then the order will include two "S"s, but if the first roll includes one die 10 showing the letter "S", then the order will not include two "S"s as a repeat of the single "S" rolled.

Once the two orders are recorded as the list, or otherwise written down, the round may begin with a timer being started. The time could be any number of minutes, for example five minutes, ten minutes, fifteen minutes, etc. The use of a timer is optional.

Using all of the different pairs of letters from the list, each player creates an entry by assigning a famous person to each pair of letters from the list of pairs of letters such that a first letter in a first name of the famous person corresponds to the first letter in a respective pair of letters and a first letter in a last name of the famous person corresponds to the second letter in the respective pair of letters. For example, if a pair of letters in the list is "C" and "D", a player's entry could be "Charles Dickens."

If a wild was rolled, the rolling player may assign any letter to the wild. Alternatively, the rolling player may decide to omit or not assign the wild. In such a case, where the pair has wild which is unassigned, the famous person assigned to that pair must be known by a single name. For example, if the pair of letters in the list is "P" and "unassigned wild", a player's entry could be "Pinocchio."

Once the timer is completed, or once everyone has completed all of their entries, the entries of all of the players are compared to award points so that a score for that round may be awarded. Any number of scoring and points systems may be used. Below is an exemplary scoring scheme disclosed with the understanding that the scoring is not limited to this particular embodiment:

- one point awarded for each entry of a player that matches an entry of another player;
- two points awarded for each entry of a player that is unique to the entries of the other players;
- three points awarded for each entry of a player wherein no other player had an entry for that pair of letters;
- four points awarded for each entry of a famous person that goes by a single name (when used with the "unassigned wild").

After comparing all of the entries, each player obtains a total for that round, and then the game may be repeated for an agreed number of rounds, for example, one round for each player. Each player's totals from all of the rounds are added together and the player with the highest total is declared the winner.

As mentioned above, in an embodiment, the dice 10 used includes the two pluralities 12*a*, 12*b* of dice 10. Since the letters on the second plurality 12*b* of dice 10 contain less common letters, the game is made harder by including those dice 10. In such an embodiment, there is the possibility of two wilds being rolled. The rolling player may choose to create a pair of two specified letters (one for each wild), chose to pair each wild with a different letter and assign each wild a letter, or chose to make one or both of the wilds an "unassigned wild." If the two wilds are both made as an "unassigned wild," that round will include two pairs with an unassigned wild, thus requiring players to identify two famous people having a single initial matching the associated letter.

For example, if there are two wilds, and the letters "P" and "S", the rolling player may decide from two of the following options:

- pair a wild with the "P" and pick a letter for the wild;
- pair a wild with the "S" and pick a letter;
- pair a wild with the "P" and declare the wild an "unassigned wild" (correct answers will include single name famous people like "Pocahontas"); and,
- pair a wild with the "S" and declare the wild an "unassigned wild" (correct answers will include single name famous people like "Socrates").

As discussed above, in virtual versions or embodiments, all, one, or any of the steps may be performed exclusively or partially with or by a computer program, such as in an app or video game. The app or video game be played by players in remote locations, or by players in the same location. Additionally, a virtual version may utilize virtual dice or real dice regardless of the location of the players. Additionally, the virtual version may include the option to decide which type of dice to use.

The virtual version and methods described herein may utilize a controller or a computing device comprising a processing unit and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including modules, executed by one or more computers or other devices. Generally, modules include routines, programs, objects, components, data structures, etc., that perform particular tasks or implement particular abstract data types. Typically, the functionality of the modules may be combined or distributed as desired in various embodiments.

It will be appreciated that the virtual version may utilize systems and devices and components thereof that communicate through any of various network protocols such as TCP/IP, Ethernet, FTP, HTTP and the like, and/or through various wireless communication technologies such as Bluetooth, GSM, CDMA, Wi-Fi, and WiMAX, is and the various computing devices described herein may be configured to communicate using any of these network protocols or technologies.

Playing any embodiment of the present game is believed to help promote memory recall and other brain functions, promote fine motor schools, and promote increased social activity.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise.

The invention claimed is:

1. A method of playing a game by two or more players, the method comprising the steps of:

a) rolling, in a first roll, a first plurality of dice, each die from the first plurality of dice comprising six sides, and each side comprising a letter selected from a group consisting of: A, B, C, D, E, F, G, H, I, J, K, L, M, N, O, P, R, S, T, V, W, and wild;

b) determining and announcing a first ordered sequence of the letters shown on the first roll;

c) re-rolling, in a second roll, the first plurality of dice;

d) determining and announcing a second ordered sequence the letters shown on the second roll and forming a list of pairs of letters by pairing each letter from the first ordered sequence with a corresponding letter from the second ordered sequence based on a positional correspondence, such that each pair of letters includes one letter from the first roll of the first plurality of dice and one letter from the second roll of the first plurality of dice, wherein no side of any die is reused within a roll or between the first and second rolls;

e) for each player, creating an entry by assigning a famous person to each pair of letters from the list of pairs of letters such that a first letter in a first name of the famous person corresponds to the first letter in a respective pair of letters and a first letter in a last name of the famous person corresponds to the second letter in the respective pair of letters;

f) comparing the entries of each player and awarding points for each pair of letters and assigning a score based on the comparison; and, g) determining a winner based on the points awarded.

2. The method of claim 1, further comprising:

before step g), repeating steps a) to f) a number of times corresponding to a number of players.

3. The method of claim 1, wherein step a) further includes rolling, in the first roll, a second plurality of dice, each die from the second plurality of dice comprising six sides, and each side comprising a letter selected from a group consisting of: Q, U, X, Y, Z, and wild, wherein step c) further includes re-rolling, in the second roll, the second plurality of dice.

4. The method of claim 1, wherein the dice are virtual dice.

5. A non-transitory computer readable medium comprising instructions that when executed by a processor cause the processor to perform one or more steps of the method of claim 1.

6. The method of claim 1, wherein awarding points includes assigning a higher point value when no other player assigns a famous person to a pair of letters.

7. The method of claim 1, wherein awarding points includes assigning different point values based on whether a famous person assigned to a pair of letters is unique among the players.

8. The method of claim 1, wherein when a wild letter appears in a pair of letters, the wild letter is assigned a selected letter by a rolling player.

9. The method of claim 1, wherein when a wild letter is left unassigned, the famous person assigned to the corresponding pair is identified by a single name.

10. The method of claim 1, wherein all letters in the first ordered sequence are used to form the list of pairs of letters.

* * * * *